US00RE35187E

United States Patent [19]

Gortz

[11] E Patent Number: Re. 35,187

[45] Reissued Date of Patent: Mar. 26, 1996

[54] FLUID DISPENSING APPARATUS WITH PRESTRESSED BLADDER

[76] Inventor: Norman Gortz, 111 Granville Dr., Newport Beach, Calif. 92660

[21] Appl. No.: 940,625

[22] Filed: Sep. 4, 1992

Related U.S. Patent Documents

Reissue of:

[64] Patent No.: 4,953,753
Issued: Sep. 4, 1990
Appl. No.: 205,158
Filed: Jun. 10, 1988

[51] Int. Cl.[6] ..... B65D 35/56

[52] U.S. Cl. ..... 222/105; 222/212; 222/386.5

[58] Field of Search ..... 222/95, 96, 105, 222/92, 212, 211, 183, 386.5, 386; 604/132

[56] References Cited

U.S. PATENT DOCUMENTS

| | | | |
|---|---|---|---|
| 2,619,116 | 11/1952 | Ralston | 222/212 |
| 2,816,690 | 12/1957 | Lapi | 222/92 |
| 3,361,303 | 1/1968 | Jacuzzi | 222/183 |
| 3,469,578 | 9/1969 | Bierman | 128/214 |
| 3,486,539 | 12/1969 | Jacuzzi | 141/329 |
| 3,506,005 | 4/1970 | Gilio et al. | 128/214 |
| 3,672,543 | 6/1972 | Roper et al. | 222/183 |
| 3,698,595 | 10/1972 | Gortz et al. | 220/63 R |
| 3,738,538 | 6/1973 | Roper et al. | 222/183 |
| 3,767,078 | 10/1973 | Gortz et al. | 220/63 R |
| 3,791,557 | 2/1974 | Venus, Jr. | 222/105 |
| 3,796,356 | 3/1974 | Venus, Jr. | 222/212 |
| 3,876,115 | 4/1975 | Venus, Jr. et al. | 222/183 |
| 3,907,169 | 9/1975 | Gortz et al. | 222/95 |
| 3,940,026 | 2/1976 | Kain | 222/212 |
| 3,961,725 | 6/1976 | Clark | 222/211 |
| 3,981,415 | 9/1976 | Fowler et al. | 222/95 |
| 4,140,117 | 2/1979 | Buckles et al. | 128/213 R |
| 4,222,499 | 8/1980 | Lee et al. | 222/183 |
| 4,318,400 | 3/1982 | Peery et al. | 128/214 F |
| 4,324,350 | 4/1982 | Thompson | 222/212 |
| 4,386,929 | 6/1983 | Peery et al. | 604/132 |
| 4,419,096 | 12/1983 | Leeper et al. | 604/132 |
| 4,446,991 | 5/1984 | Thompson | 222/94 |
| 4,458,830 | 7/1984 | Wending | 222/212 |
| 4,491,247 | 1/1985 | Nitchman et al. | 222/183 |
| 4,702,397 | 10/1987 | Gortz | 222/211 |
| 4,769,008 | 9/1988 | Hessel | 604/132 |

*Primary Examiner*—Kenneth W. Noland
*Attorney, Agent, or Firm*—Lyon & Lyon

[57] ABSTRACT

An apparatus for dispensing for fluids. The apparatus generates its own positive pressure from a prestressed elastomeric material. The dispenser includes a resiliant bladder of generally tubular shape having an open end into which an internal prestressing mandrel is inserted to prestress the bladder in both the radial and axial directions. The mandrel has at least three fins joined along longitudinal edges to form a plurality of passages, the bladder being joined or otherwise secured to the mandrel at both ends, and the passages being in communication with a valve means. A simplified valve means for filling and dispensing is also included

36 Claims, 3 Drawing Sheets

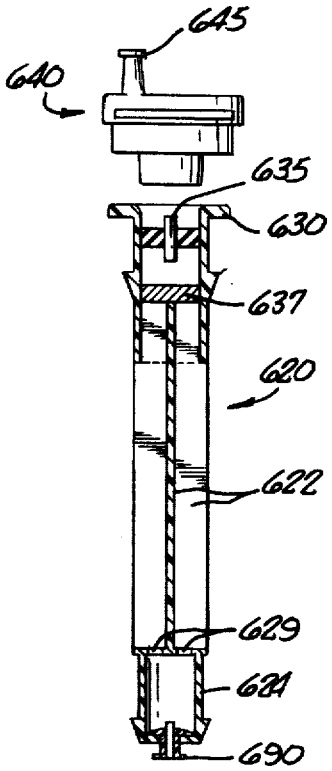
FIG. 6.
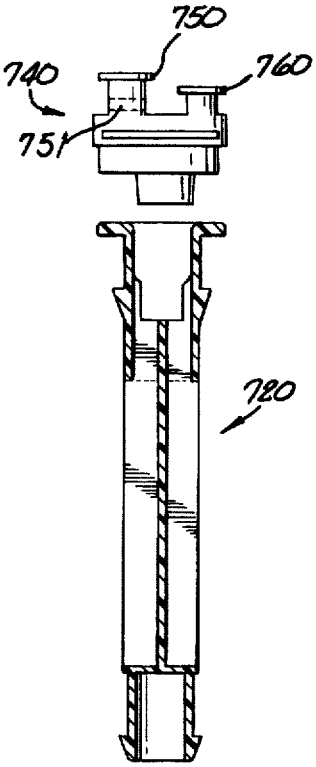
FIG. 7.
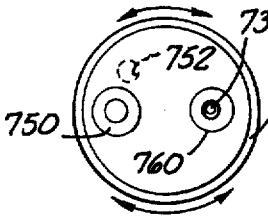
FIG. 7B.
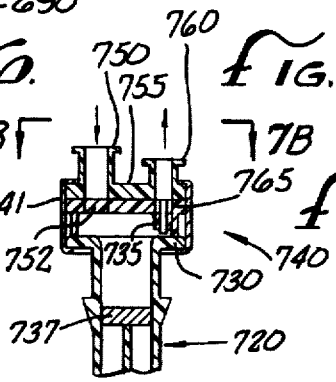
FIG. 8.
FIG. 7A.
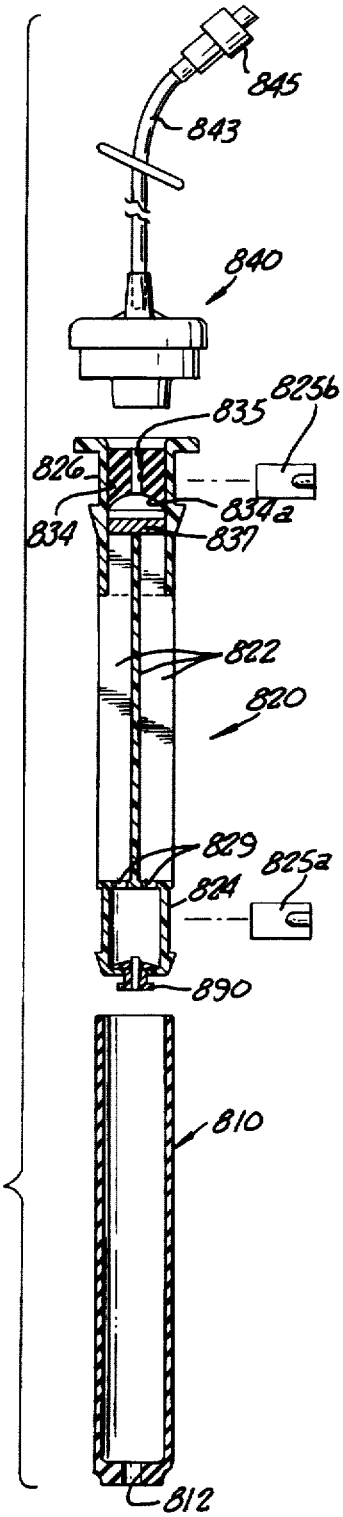

FLUID DISPENSING APPARATUS WITH PRESTRESSED BLADDER

Matter enclosed in heavy brackets [ ] appears in the original patent but forms no part of this reissue specification; matter printed in italics indicates the additions made by reissue.

BACKGROUND OF THE INVENTION

The field of the present invention is fluid dispensing devices that use an expandable elastomeric bladder for the dispensing force.

There are many applications in consumer products, industrial applications, and medical devices for propelling a fluid or other flowing, dispensable products out of a container. The most popular type of dispenser is the aerosol can, a pressure container having a propellant gas for expelling fluids. Disadvantages of an aerosol can include the volume of product wasted and left in the container after all the propellant is consumed, the potential for explosion of a pressurized vessel, and damaging effect to the environment caused by certain propellants such as chlorofluorocarbons (CFC).

There are many existing bladder type dispensing devices. In order for a bladder type dispensing apparatus to dispense the maximum amount of product, the bladder is prestressed in the empty condition with a mandrel. The elastomeric bladder may then dispense the maximum amount of fluid as it returns to its beginning unfilled state.

There have been several methods devised to provide the prestressing of the elastomeric bladder. Gortz et al., U.S. Pat. No. 3,698,595, stretches the resilient bladder over an external tapered mandrel. Another external prestressing method is disclosed in Gortz et al., U.S. Pat. No. 3,907,169, in which a bladder is wrapped around and anchored at one end to a curved external support rib.

The present invention is more closely related to an internal prestressing mandrel such as disclosed in Jacuzzi, U.S. Pat. No. 3,361,303 which has a solid internal prestressing stem with a wedge shaped channel along one side thereof. Roper et al., U.S. Pat. No. 3,738,538 also discloses an internal mandrel which prestresses the bladder in both the axial and radial directions.

However, none of the existing devices have devised or even recognized the requirements for a simple and inexpensive prestressed bladder system which is reliable, meets storage requirements, and provides constant flow characteristics obtained by the present invention.

SUMMARY OF THE INVENTION

The present invention is directed to a dispensing apparatus for fluids such as liquids of various viscosities or any other flowable products. More particularly, the present invention is directed to a self-generating positive pressure dispensing device deriving its pressure from a prestressed elastomeric material. The dispenser includes a resilient bladder of generally tubular shape having an open end into which an internal prestressing mandrel is inserted to prestress the bladder in both the radial and axial directions. The mandrel has at least three fins joined along longitudinal edges to form a plurality of passages, the bladder being joined or otherwise secured to the mandrel at both ends, and the passages being in communication with a valve means.

The present invention also includes a simplified valve means for filling and dispensing.

BRIEF DESCRIPTION OF THE DRAWINGS

FIG. 6 illustrates an alternative mandrel and valve design in partial cross-section with an internal capillary flow control passage;

FIG. 7 illustrates and alternative mandrel design in partial cross-section having an externally attached flow controller with independent flow passages;

FIG. 7A is a cross-sectional view of the flow controller of FIG. 7 and FIG. 7B; and FIG. 8 illustrates another alternative mandrel design having fluid connection means at both ends.

DETAILED DESCRIPTION OF PREFERRED EMBODIMENT

The preferred embodiment of the present invention will now be described with respect to the figures.

When referring to the figures, any element designated by a numeral in one figure will be designated by the same numeral in any other figure.

Figure 1A:
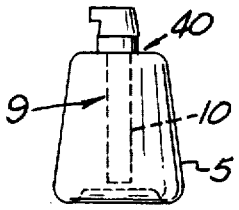
FIGS. 1A, 1B, and 1C are plan views of three outer containers each housing a pressure capsule.
Figure 1B:
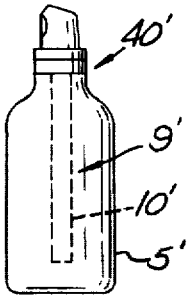
Figure 1C:
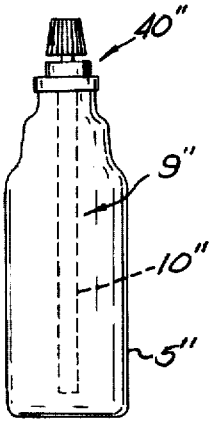

FIG. 1A is a plan view of a container 5 with a pressure capsule 9 therein. The capsule 9 includes a resilient bladder 10 which expands when filled with fluid but elastically retains its physical characteristics to provide motive force to dispense fluid back out through a valve mechanism generally shown by 40 to be described later. Such a container shape could provide a suitable external appearance for a shaving cream dispenser. FIGS. 1B and 1C illustrate alternate containers 5' and 5" demonstrating that the present invention is applicable to a variety of container shapes having the suitable capsules 9' and 9" including bladders 10' and 10".

Figure 2A:
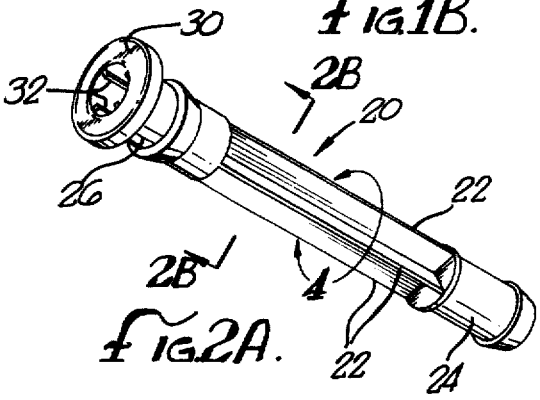
FIG. 2A is a perspective view of the prestressing mandrel according to the present invention.
Figure 2:
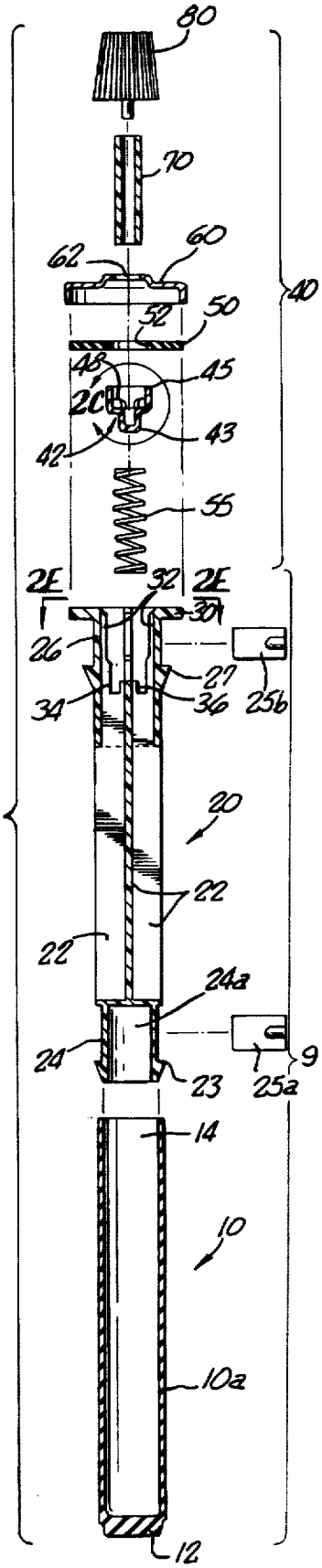
FIG. 2 is an exploded cross-sectional side view of the dispensing apparatus according to the present invention.
Figure 2D:
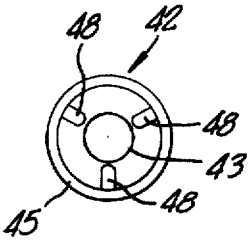
FIG. 2D is a top view of FIG. 2C taken along the line of 2D—2D showing the cup member.
Figure 2B:
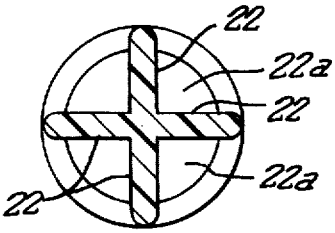
FIG. 2B is a cross-sectional view of FIG. 2A taken along the line 2B—2B illustrating the fins of the mandrel.

FIG. 2 is a cross-sectional exploded view of a resilient bladder 10, an internal stress member or mandrel 20 and a valve mechanism 40. FIG. 2A is a perspective view of the mandrel 20 of FIG. 2 and FIG. 2B is a cross-sectional view of the fins in FIG. 2A. The mandrel 20 is comprised of plurality of fins 22 which are joined along a common longitudinal edge to form a generally circular outer perimeter. FIGS. 2, 2A and 2B illustrate a mandrel 20 having four fins 22 extending radially outward along a central axis of the mandrel 20. The fins 22 form a plurality of four longitudinal passages 22a between adjacent fins 22.

The bladder 10 is constructed from a resilient material which may include natural rubber, a synthetic rubber, or a combination of natural and synthetic rubbers. The preferred bladder material will depend on the particular application with consideration of factors such as size of the bladder and interaction of the material with the product. The preferred material should exhibit high memory capacity and low hysteresis. The bladder 10 has an open end 14 and a closed end 12, the side wall 10a having a wall thickness necessary to contract and thereby dispense fluids. In a dispenser of about 120–180 milliliters (ml), a wall thickness of about 0.10 inches is suitable for most flowable products including such viscous mixtures as toothpaste. The open end 14 of the bladder 10 may be slid over the mandrel 20; the bladder 10 having dimension of both its length and diameter less than that of the mandrel 20 so the mandrel 20 exerts both axial and longitudinal stresses on the bladder 10 in the empty condition. The symmetrical orientation of the passages 22a allows for substantially even and symmetrical filling and emptying of the bladder 10 simultaneously through all the passages 22a.

Once the bladder 10 has been stretched over the mandrel 20, it is secured at each end by clamps 25a and 25b. The mandrel 20 has a clamp surface 24 at its lower end (as viewed in FIG. 2) and a clamped surface 26 near its open, flared end 30. The flared end 30 provides a flange surface for sealing to the valve means, the flared end 30 being connectable to the valve means 40 40.

Figure 2C:
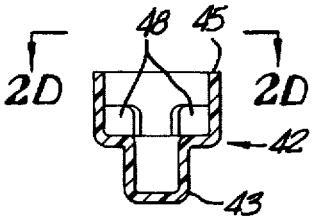
FIG. 2C is a detailed cross-sectional view of the cup member of FIG. 2.
Figure 2E:
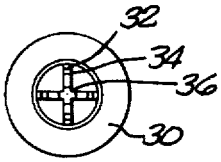
FIG. 2E is a top view of the mandrel of FIG. 2.

The valve means 40 is comprised of a cup member 42 which is biased against a sealing gasket 50 within a ferrule 60. To assemble the valve means 40, the spring 55 and the cup member 42 are positioned in a cavity within the upper end in the mandrel 20, the spring 55 fitting around an inner guide member 36 and within the outer guide members 34, the cup member 42 fitting within guide members 32 (as best shown in FIGS. 2, 2A and 2E). The cup member 42, which is shown in greater detail in FIGS. 2C and 2D, has shoulders 48 which are contacted by the stem 70 which is inserted through a hole 62 in ferrule 60 and a hole 52 in gasket 50. When assembled, an actuator, such as a spray head 80, may be pressed downward causing the stem 70 to compress the spring 55 which forces the cup member 42 away from the sealing gasket 50 thereby spacing the sealing surface 45 of the cup member 42 away from the sealing gasket 50.

Figure 3A:
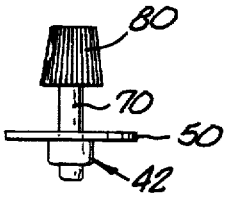
FIGS. 3A and 3B are detailed views of the valve means, FIG. 3A illustrating the closed condition and FIG. 3B in partial cross-section illustrating the open, fluid flowing condition.
Figure 3B:
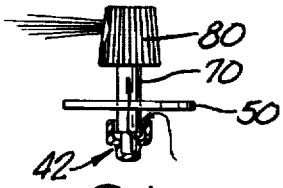
Figure 3:
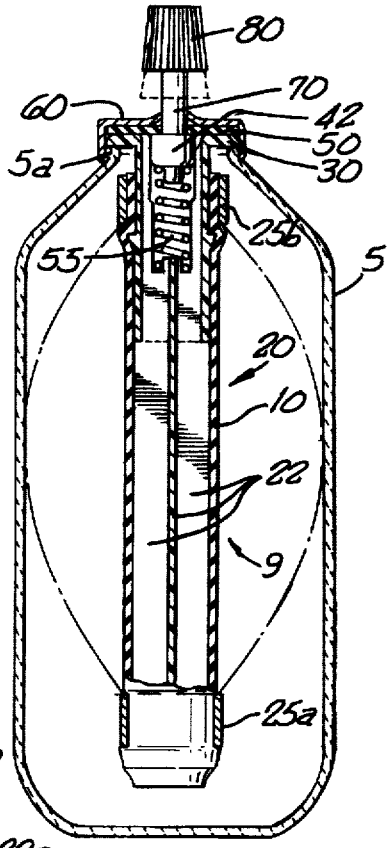
FIG. 3 schematically illustrates a dispensing apparatus within a container with the bladder in a filled, expanded condition.

Referring now to FIGS. 3, 3A and 3B, an assembled dispensing unit is illustrated with a resilient bladder 10 stretched about the mandrel fins 22 all contained within an outer container 5. The cup member 42 is biased by the spring 55 against the sealing gasket 50 with the ferrule 60 securing the mandrel flange 30 against the sealing gasket 50. FIGS. 3A and 3B illustrate the actuation method according to the present invention. In its resting condition, the spring 55 biases the cup 42 against the sealing gasket 50 as shown in FIG. 3A. Referring now to FIG. 3B, the spray head 80 is shown depressed, forcing the stem 70 to move axially downward to overcome the tension of spring 55 thereby creating a flowpath (as indicated by the arrows) past the sealing gasket 50 into the cup member 42, up the stem 70, and out the spray head 80.

The sealing gasket 50 serves as a selaing surface for three locations. The sealing surface 45 of the cup member 42 seals against the gasket 50. The inner side of hole 52 of the gasket 50 seals against the outer circumference of the stem 70 and the ferrule 60 seals the gasket 50 against the sealing flange 30.

FIG. 3 illustrates that the resilient bladder 10 is secured by clamps 25a and 25b at both ends thereof. This dual clamping configuration maintains proper sealing of the bladder 10 and also ensures application of axial prestress forces, the bladder 10 having a shorter length than that of the mandrel 20. The clamp 25a at the bottom end also prevents the bladder 10 from bulging or ballooning out about the bottom of the mandrel 10. This dual clamping configuration ensures that the bladder 10 maintains a symmetrical shape when filled (as shown by the dotted line in FIG. 3). The symmetrical shape helps to avoid variations in applied pressure during contraction of the bladder 10.

Generally, the dispenser will initially be assembled without the stem 70 or spray head 80. A commercial filler nozzle (not shown) may be inserted into the valve means 40, the filler nozzle being of similar shape to stem 70. The nozzle may contact the cup member 42, depressing the surface 45 of the cup member 42 away from the gasket surface 50 thus opening the valve 40 for filling the bladder 10. Upon filling, the bladder 10 assumes a semi-"sausage" shape. Upon completion of the filling operation, the nozzle may be removed and the cup member 42, which is under spring tension, is forced against the sealing gasket 50 thus closing the valve 40. The stem 70 and spray head 80 or other suitable actuator may then be added to provide the desired flow pattern.

FIG. 3 illustrates one embodiement for an assembly method to a container 5. The outer ferrule 60 snaps over both of the flange 30 of the mandrel 20 and around a lip 5a of the container 5 securing the mandrel 20 of the capsule 9 to container 5.

Figure 3C:
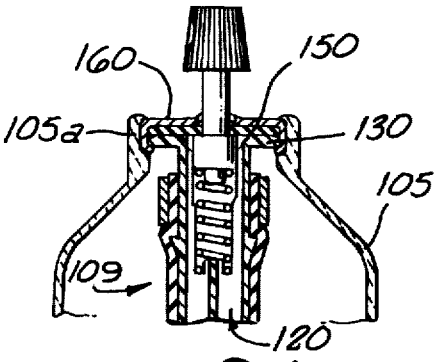
FIG. 3C is a partial cross-sectional view of a preferred connection scheme for the mandrel and outer container.

An alternate and preferred embodiment is illustrated in FIG. 3C. FIG. 3C illustrates a capsule 109 with similar valve means and resilient bladder as in FIG. 3. The difference in this preferred embodiment is the attachment of the capsule 109 to the container 105. It is desireable that the capsule 109 be capable of preassembly before attachment to the container 105. As such the ferrule 160 is attached around the gasket 150 and the flange 130 compressing the gasket 150 to provide a tight seal between the flange 130 and the ferrule 160. The capsule 109 thereby becomes a working dispenser even without the outer container 105. Subsequently the capsule may be inserted into the container 105 which has a rim 105a which accommodates a snap fit insertion of the ferrule 160 into a groove in the rim 105a.

The configuration of the valve means 40 enhances sealing forces. Pressure forces exerted by the bladder 10 act upon the cup member 42 in a direction as to increase sealing force against the gasket 50.

In contrast, filling forces operate in a direction opposite internal blader forces. During the filling procedure, filling fluid pressure force helps to open the valve 40. It is conceivable that under certain conditions the bladder 10 may be filled through a nozzle without physically contacting the cup member 42. Since the filling pressure itself acts in a direction tending to depress the cup member 42, the valve means 40 may be opened to allow filling solely by filling pressure. It is preferable, however, for the force applied by the spring 55 to be greater than filling pressure forces to ensure a tight seal.

Figure 4:
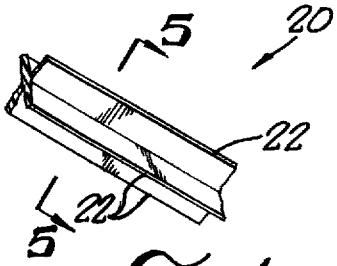
FIG. 4 is a detailed perspective view of the fins of the mandrel of FIG. 2A.
Figure 5:
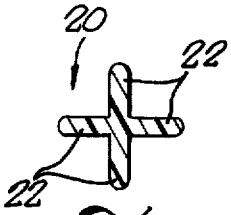
FIG. 5 is a cross-sectional view of FIG. 4 taken along the line 5—5 showing a four-fin design.

FIG. 4 illustrates a detail of the fins 22 of FIG. 2A. FIG. 5 illustrates a cross-sectional view of the fins 22 in FIG. 4 showing a configuration with four fins 22 in the shape of a "+" or an "×" depending on the orientation of the viewer. This simple "+" shpae is easilty manufactured in a single forming step. Though the preferred fin configuration is the four-fin design of FIG. 5, many other variations of fin configurations are feasible and envisioned. Certain variations are illustrated and described.

Figure 5A:
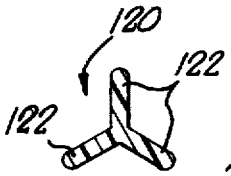
FIG. 5A is a cross-sectional view of an alternate three-fin design embodiment.

FIG. 5A is an alternate embodiement of a mandrel 120 having three fins 122 formed in the shape of a "Y".

Figure 5B:
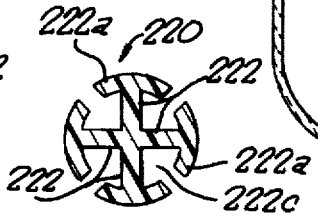
FIG. 5B is a cross-sectional view of another alternate mandrel fin design having arcuate extensions on the outer perimeter of each fin.

FIG. 5B is another alternate fin design of a mandrel 220 having four fins 222 each having arcuate fin extensions 222a along the outer edges of the fins 222. The arcuate extensions 222a provide radial support and prestress for the bladder 10 and also reduce the volume of the passages 222c between adjacent fins 222a. When the bladder 10 has completely contracted and comes into contact with the fins 222, no more fluid is forced through the passages 222c. Therefore, the leftover volume of product in the passages 222c becomes a residue or wasted product. The addition of the arcuate extensions 222a on the fins 222 reduces this volume.

Figure 5C:
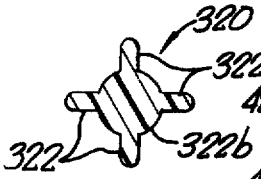
FIG. 5C is a cross-sectional view of another alternative mandrel fin design having internal arcuate segments filling spaces between adjacent fins.

FIG. 5C illustrates and alternative volume reducing design of a mandrel 320. This fin design has four fins 322 with inner arcuate segments 322b between adjacent fins 322.

Figure 5D:
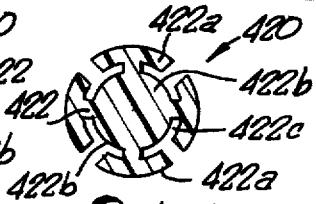
FIG. 5D is a cross-sectional view of yet another alternative mandrel fin design having both arcuate extensions on the outer portions of the fins and inner arcuate segments filling the gaps between adjacent fins.

FIG. 5D illustrates a combination mandrel 420 having four fins 422, each fin having an arcuate extension 422a with inner arcuate segments 422b between adjacent fins 422. Such a central mandrel design minimizes waste of product. Such a design might be particularly useful where the product is very expensive, or potentially in a high volume application where the mandrel 20 must be relatively large creating the potential for large passageways. The resulting reduced passageways 422c in the embodiment of FIG. 5D helps greatly reduce the amount of wasted fluid.

The reaction of passage volume is accomplished by an increase of material in manufacture of the mandrel 20. A typical material of construction such as polypropylene is sold by weight. Increasing the amount of material increases the cost of manufacture. The more complicated design may also be more difficult to form further increasing the cost of manufacture. The savings in conserving product is therefor offset by potential increase in manufacturing cost. FIGS. 6, 7, and 8 illustrate alternative embodiments certain of which have features which are particularly applicable to the medical industry. FIG. 6 illustrates a mandrel 620 which is similar to the mandrel 20 of FIG. 2A. The mandrel 620 has four fins attached along a common longitudianl edge. The main difference of this embodiment is an alternate valve means 640. The control for outgoing fluid is provided externally with the valve means 640 being clipped onto the connector flange 630. Fluid communication may then be accessed through a connector such as luerlock 645. To maintain a constant and controllable flow rate, a reduced fluid passage is provided through a flow control tube 635. Any fluid exiting the bladder must pass through the tube 635. To avoid the potential for plugging of this small tube 635, a filter 637 is provided to one side of the tube 635 for preventing particles from enetering the tube 635. A separate inlet port 690 is provided in the bottom of the mandrel 620. The inlet port 690 may include a one-way valve so that fluid may only enter through the inlet port 690 and not exit. The passages 629 are provided through the bottom portion of the mandrel 620 to allow fluid communication from the inlet port 690 to the passages between adjacent fins 622. Since fluid enters through the bottom inlet valve 690, it must pass through the filter 637 before entering the flow control tube 635. The remaining features of this alternative embodiment which are not fully described or illustrated here are similar to and may be provided by descriptions of embodiments previously or later described.

FIG. 7 illustrates another alternative embodiment having a mandrel 720 connected to an alternate valve means 740. The valve means 740 has both an inlet or filling connection 750 with a one-way valve 751 and an outlet or exit connection 760.

FIG. 7A is a cross-sectional view of the valve means 740 and the top of the mandrel 720 of FIG. 7. FIG. 7B is a top view of FIG. 7A. FIG. 7A and 7B illustrate the rotatable valve piece comprised of a top piece 755 attached to both the filling connection 750 and the outlet connection 760. The top piece 755 seals against the bottom piece 765. Bottom piece 765 has an inlet port 752 which may be aligned with the inlet connection 750 and an outlet port shown as a flow control tube 735. The top piece 755 may be rotated relative to the bottom piece 765 to alternately align the inlet connection 750 with the port 752 to allow filling, align the outlet connection 760 with the flow control tube 735 to allow exit flow, or align neither of the ports so that flow is closed off. FIG. 7A also shows the mandrel 720 having a filter 737 to prevent particles from clogging the flow control tube 735. The filter 737 may preferably be located adjacent to the outlets 735 so that the fluid entering the bladder through the inlet connection 751 does not pass through the filter 737 but must pass through the filter 737 before entering the flow control tube 735. Alternately, a separate inlet channel (not shown) could direct incoming flow from the inlet connection 750 into the bladder.

FIG. 8 illustrates yet another alternative embodiment which may be preferred for medical applications. The mandrel 820 of FIG. 8 has a plurality of fins 822 similar to the fins 22 in the mandrel 20 of FIG. 2A. The alternate mandrel 820 however has an additional port through the bottom section 824 preferably serving as an inlet. Passages 829 are provided through the bottom portion of the mandrel 820 to allow fluid communication between adjacent fins 822 to a valve mechanism 890. Valve mechanism 890 is preferably a fill port which may include a one-way valve such as a ball check valve on the bottom of the mandrel 820.

A filter 837 is added to prevent particles from clogging the flow control tube 835 used to control outgoing fluid flow to the valve mechanism 840. The flow control tube 835 is actually illustrated as a port through a block piece 834 in the throat of the mandrel 820. The inside surface 834a of the block piece 834 is concave to direct fluid flow into the tube 835. Depending on size constraints (a small diameter tube may be required to achieve the desired flow rate and such a small diameter may not be obtainable by drilling a hole through a block piece), surface smoothness requirements or other design considerations, several suitable flow control passages could be employed including orifices, capillary flow control tubes, through-ports in the block piece, baffled ports and others. The valve mechanism 840 may be attached to a flexible line 843 running to a connection 845 such as a luerlock device. Such a connecting device may then be attached to a hypodermic needle or other such application.

The bladder 810 is similar to the bladder 10 of FIG. 2 but also includes a bottom passage 812 which is sealably connected about the check valve 890. Alternately the check valve 890 could be sealed directly to a portion of the mandrel 820, the bladder 810 being sealably secured to a sealing surface 824 by clamp 825 and on the opposite end to a sealing surface 826 by clamp 825b.

Though specific embodiments and applications have been shown and described, many more modifications and applications will become apparent to those skilled in the art from the descriptions herein. For example, referring to FIG. 2, the bladder 10 is shown to have a cylindrical or tubular shape with a closed end 12. Since the bladder is sealably secured to the sealing surface 24 by the clamp 25a and the passages between adjacent fins 22 does not extend past the surface 24a, there is no need for the closed bottom 12 of bladder 10. Therefore, the bladder 10 may be constructed instead of from a molding method from an extruding method such as used to make rubber tubing with appropriate lengths of bladder cut from a longer length. It is anticipated that such a manufacturing method for the bladder will be less expensive than a molding method, but such a method will provide an additional location for fluid leakage out of the bladder 10. The scope of the invention therefore is not to be limited except in the spirit of the claims that follow.

I claim:

1. A fluid dispenser comprising a container body;

a resilient bladder of generally tubular shape having an open end; and an internal prestressing mandrel comprising a first end, a second end, at least three fins joined at a common longitudinal edge to form a plurality of passages therealong, and a flange on the first end connectable to a valve means, said resilient bladder being stretched around the mandrel and sealed around the first end and the second end of the mandrel, the resilient bladder being subjected to both radial and axial stresses, wherein the valve means comprises a ferrule having a gasket surface on one side thereof; a spring; a cup member positioned within the first end of the mandrel, the cup member having a shoulder therein and biased by the spring against the gasket surface to form a seal against the gasket surface; and a hollow stem inserted through the ferrule and the gasket surface and into the cup member contacting the shoulder therein, the gasket surface sealing against an outer surface of the hollow steim, the cup member being movable away from the gasket surface by depression of the hollow stem forming a communication channel from the passages, past the gasket surface into the cup member, and into the hollow stem, wherein the ferrule secures the valve means to the flange.

2. The fluid dispenser according to claim 1 wherein the first end portion comprises an inner guide member and first outer guide members for accepting the spring second outer guide members for accepting the cup member, and a outer flange surface on the flange able to form a seal against the gasket surface of the ferrule.

3. The fluid dispenser according to claim 1 having four fins, the fins generally forming a "+" shaped cross section.

4. The fluid dispenser according to claim 1 further comprising a second valve means at the second end of the mandrel, the passages extending through the second end of the mandrel providing fluid communication between the passages and the second valve means.

5. The fluid dispenser according to claim 4 wherein the second valve means comprises a one-way valve permitting flow only in a direction into the resilient bladder.

6. A dispensing apparatus comprising (a) a mandrel comprised of:

a first end portion including a flange, the flange being connectable to a valve means, a second end portion, and a middle portion between the first and second end portions, the middle portion comprised of at least three fins joined longitudinally along a common inner edge, the fins extending radially outward from the common inner edge and being angularly spaced from each other forming passages therebetween;

(b) a resilient bladder stretched both axially and radially over the mandrel, the resilient bladder having a first open end connected to the first end portion and a second end connected to the second end portion; and (c) a valve means connected to the flange on the first end of the mandrel, the passages extending through the first end of the mandrel providing fluid communication between the passages and the valve means, wherein the valve means comprises a ferrule having a gasket surface on one side thereof; a spring; a cup member positioned within the first end of the mandrel, the cup member having a shoulder therein and biassed by the spring against the gasket surface to form a seal against the gasket surface; and a hollow stem inserted through the ferrule and the gasket surface and into the cup member contacting the shoulder therein, the gasket surface sealing against an outer surface of the hollow stem, the cup member being movable away from the gasket surface by depression of the hollow stem forming a communication channel from the passages, past the gasket surface into the cup member, and into the hollow stem, and wherein the ferrule secures the valve means to the flange.

7. The dispensing apparatus according to claim 6 having four fins, the fins generally forming a ["""] "X" shaped cross section.

8. The dispensing apparatus according to claim 6 having three fins, the fins generally forming a "Y" shaped cross section.

9. The dispensing apparatus according to claim 6 wherein the first end portion comprises an inner guide member and first outer guide members for accepting the spring, second outer guide members for accepting the cup member, and an outer flange surface on the flange able to form a seal against the gasket surface of the ferrule.

10. A fluid dispenser comprising a container body;

a resilient bladder of generally tubular shape having and open end; and an internal prestressing mandrel comprising a first end, a second end, at least three fins joined at a common longitudinal edge to form a plurality of passages therealong, and a flange on the first end connectable to a valve means, said resilient bladder being stretched around the mandrel and sealed around the first end and the second end of the mandrel, the resilient bladder being subjected to both radial and axial stresses, wherein the fins have arcuate extension means along outer edges thereof for reducing volume of the passages.

11. The fluid dispenser according to claim 10 wherein the mandrel has inner arcuate segments means between the fins for reducing volume of the passages.

12. A fluid dispenser comprising a container body;

a resilient bladder of generally tubular shape having and open end; and an internal prestressing mandrel comprising a first end, a second end, at least three fins joined at a common longitudinal edge to form a plurality of passages therealong, and a flange on the first end connectable to a valve means, said resilient bladder being stretched around the mandrel and sealed around the first end and the second end of the mandrel, the resilient bladder being subjected to both radial and axial stresses, wherein the mandrel has inner arcuate segment means between the fins for reducing volume of the passages.

13. A dispensing apparatus comprising (a) a mandrel comprised of:

a first end portion including a flange, the flange being connectable to a valve means, a second end portion, and a middle portion between the first and second end portions, the middle portion comprised of at least three fins joined longitudinally along a common inner edge, the fins extending radially outward from the common inner egde and being angularly spaced from each other forming passages therebetween;

(b) a resilient bladder stretched both axially and radially over the mandrel, the resilient bladder having a first open and connected to the first end portion and a second end connected to the second end portion; and (c) a valve means connected to the flange on the first end of the mandrel, the passages extending through the first end of the mandrel providing fluid communication between the passages and the valve means;

wherein the fins have arcuate extension means along outer edges thereof for reducing volume of the passages.

14. A dispensing apparatus comprising (a) a mandrel comprised of:

a first end portion including a flange, the flange being connectable to a valve means, a second end portion, and a middle portion between the first and second end portions, the middle portion comprised of at least three fins joined longitudinally along a common inner edge, the fins extending radially outward from the common inner edge and being angularly spaced from each other forming passages therebetween;

(b) a resilient bladder stretched both axially and radially over the mandrel, the resilient bladder having a first open end connected to the first end portion and a second end connected to the second end portion; and (c) a valve means connected to the flange on the first end of the mandrel, the passages extending through the first end of the mandrel providing fluid communication between the passages and the valve means;

wherein the mandrel has inner arcuate segment means between the fins for reducing volume of the passages.

15. The fluid dispenser according to claim 13 wherein the mandrel has inner arcuate segment means between the fins for reducing volume of the passages.

16. A dispensing apparatus comprising (a) a mandrel comprised of:

a first end portion including a flange, the flange being connectable to a valve means, a second end portion, and a middle portion between the first and second end portions, the middle portion having passage therein;

(b) a resilient bladder stretched over the mandrel, the resilient bladder having a first open end connected to the first end portion; and (c) a valve means connected to the flange on the first end of the mandrel, the passages extending through the first end of the mandrel providing fluid communication from inside the mandrel to the valve means, wherein the valve means comprises a ferrule having a gasket surface on one side thereof; a spring; a cup member positioned within the first end of the mandrel, the cup member having a shoulder therein and biassed by the spring against the gasket surface to form a seal against the gasket surface; and a hollow stem inserted through the ferrule and the gasket surface and into the cup member contacting the shoulder therein, the gasket surface sealing against an outer surface of the hollow stem, the cup member being movable away from the gasket surface by depression of the hollow stem forming a communication channel from the passages, past the gasket surface into the cup member, and into the hollow stem, and wherein the ferrule secures the valve means to the flange.

17. The fluid dispenser according to claim 6 further comprising a second valve means at the second end of the mandrel, the passages extending through the second end of the mandrel providing fluid communication between the passages and the second valve means.

18. The fluid dispenser according to claim 17 wherein the second valve means comprises a one-way valve permitting flow only in a direction into the resilient bladder.

*19. A fluid dispenser having an inlet end and an outlet end with a flow restrictor and flow tube associated with the outlet end, comprising*

*a container body,*

*a mandrel comprising a first end comprising a fill end,*

*a second end comprising an exit end, the exit end providing an exit connection,*

*an elongated middle portion between the first and second end portions, the middle portion comprising at least three fins joined longitudinally along a common inner edge, the fins extending radially outward from the common inner edge and being angularaly spaced from each other forming substantilly equal flow passages therebetween,*

*the first and second ends being in fluid communication with the passages between the fins and the first and second ends having outer sealing surfaces,*

*a fill valve mechanism connected with the fill end of a mandrel,*

*a resilient bladder of generally tubular shape having a first open end providing a fill opening therethrough, and the bladder having a second open end configured to allow the bladder to be slid over the mandrel with the*

*first end of the bladder disposed about the sealing surface of the first end of the mandrel and the second end of the bladder being disposed about the sealing surface of the second end of the mandrel, and the bladder having dimension of at least one of its length and diameter less than that of the mandrel to cause the mandrel to exert at least one of axial and longitudinal stresses on the bladder when the bladder is in an empty condition,*

*means for securing the first and second ends of the bladder to the respective sealing surface of the first and second ends of the mandrel, and*

*means attached to the second end of the mandrel for enabling fluid to be dispensed from the fluid dispenser.*

*20. A fluid dispenser as in claim 19 wherein the mandrel exerts axial stress on the bladder.*

*21. A fluid dispenser as in claim 19 whereing the exit end includes a valve mechanism, and wherein the flow tube associated with the outlet end comprises a flow opening in the second end of the mandrel.*

*22. A fluid dispenser as in claim 19 wherein the fins comprise four fins angularly disposed approximately ninety degrees from one another forming a + cross sectional configuration.*

*23. A fluid dispenser as in claim 19 wherein said valve mechanism is a one way valve attached to the first end of the mandrel in communication with the opening in the first end of the bladder and surronded by the first end of the bladder.*

*24. A fluid dispenser comprising*

*a container body;*

*a resilient bladder of generally tubular shape having an open end; and*

*an internal mandrel comprising a first end, a second end, at least three fins joined at a common longitudinal edge to form a plurality of passages therealond, and the first end connectable to a valve means, said resilient bladder being stretched on the mandrel and sealed around the first end and the second end of the mandrel, the resilient bladder being subjected to both radial and axial stresses;*

*a first valve means connected to the first end of the mandrel, the passages extending through the first end of the mandrel providing fluid communication between the internal passages and the first valve means; and*

*a second valve means at the second end of the mandrel, the passages extending through the second end of the mandrel proviging fluid communication between the passages and the second valve means.*

*25. The fluid dispenser according to claim 24 wherein the second valve means comprises a one-way valve prermitting flow only in a direction into the resilietn bladder.*

*26. A dispensing apparatus comprising*

*a mandrel comprised of*

*a first end portion connectable to valve means,*

*a second end portion, and*

*a middle portion between the first and second end portions, the middle portion having passages therein,*

*a resilient bladder stretched both axially and radially over the mandrel, the resilient bladder having a first open end connected to the first end portion and a second end connected to the second end portion, and*

*a first valve means connected to the first end of the mandrel, the passages extending through the first end of the mandrel providing fluid communicaiton between the passages and the first valve means,*

*a second valve means at the second end of the mandrel, the passages extending through the second end of the mandrel providing fluid communication between the passages and the second valve means.*

*27. The fluid dispenser according to claim 26 wherein the second valve means comprises a one-way valve permitting flow only in a direction into the resilient bladder.*

*28. The fluid dispenser according to claim 26 wherein the first valve means comprises a flow control tube disposed in the first end of the mandrel.*

*29. The fluid dispenser according to claim 28 further comprising a filter means disposed in the first end of the mandrel for preventing undesirable particles from entering the first valve means.*

*30. The fluid dispenser according to claim 28 further comprising a filter means disposed in the first end of the mandrel for preventing udesirable particles from exiting the first valve means.*

*31. The fluid dispenser according to claim 28 further comprising a filter means disposed in the second end of the mandrel for preventing undesirable particles from entering the second valve means.*

*32. The fluid dispenser according to claim 28 further comprising a filter means disposed in the second end of the mandrel for preventing undesirable particles from exiting the second valve means.*

*33. An apparatus for dispensing a liquid under pressure at a predetermined substantially constant flow rate over a period of time comprising*

*a container body having a chamber,*

*an elongated support member disposed in and extending through said chamber, said support member including first and second ends,*

*a resilient bladder mounted on said support member in surface contact and sealingly secured at fixed spaced longitudinal positions thereon in said chamber for defining a pressure reservoir for holding a liquid in a pressurized state for dispensing therefrom,*

*inlet means in the first end of said support member for introducing a liquid into said resilient bladder, and*

*outlet means in the second end of said support member for conveying a liquid from said pressure chamber to a selected site.*

*34. The apparatus of claim 33 wherein the resilient bladder is mounted on the support member in a pre-stressed surface contact.*

*35. An apparatus for dispensing a liquid under pressure at a predetermined substantilly constant flow rate over a period of time comprising*

*a container body having a chamber,*

*an elongated support member disposed in and extending through said chamber, said support member including a first portion and a second portion,*

*a resilient bladder mounted on said support member in surface contact and sealingly secured at fixed spaced longitudinal positions thereon in said chamber for defining a pressure reservoir for holding a liquid in a pressurized state for dispensing therefrom,*

*an inlet in said first portion of said support member for introducing a liquid into said resilient bladder, said first portion being proximal to an end of said support member, and*

*an outlet in said second portion of said support member for conveying a liquid from said pressure chamber to a selected site, said second portion being other than proximal to said end of said support member.*

*36. The apparatus of claim 35 wherein the resilient bladder is mounted on the support member in a pre-stressed surface contact.*

* * * * *